US010508400B2

(12) United States Patent
Booth et al.

(10) Patent No.: US 10,508,400 B2
(45) Date of Patent: *Dec. 17, 2019

(54) TURF REINFORCEMENT MATS

(71) Applicant: Willacoochee Industrial Fabrics, Inc., Willacoochee, GA (US)

(72) Inventors: Eric Lee Booth, Willacoochee, GA (US); Kevin William Ray, Willacoochee, GA (US)

(73) Assignee: Willacoochee Industrial Fabrics, Inc., Willacoochee, GA (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/425,241

(22) Filed: Feb. 6, 2017

(65) Prior Publication Data

US 2017/0233970 A1 Aug. 17, 2017

Related U.S. Application Data

(60) Provisional application No. 62/294,096, filed on Feb. 11, 2016, provisional application No. 62/312,039, (Continued)

(51) Int. Cl.
*E02B 3/12* (2006.01)
*E02D 17/20* (2006.01)
(Continued)

(52) U.S. Cl.
CPC ............... *E02D 3/00* (2013.01); *A01G 13/00* (2013.01); *A01G 13/0268* (2013.01); *D02G 3/02* (2013.01); *D02G 3/36* (2013.01); *D03D 1/00* (2013.01); *D03D 13/004* (2013.01); *D03D 15/0011* (2013.01); *D03D 15/04* (2013.01);
(Continued)

(58) Field of Classification Search
CPC . B01D 39/083; D10B 2505/204; E02B 3/122; E02B 3/126; E02D 17/20; E02D 17/202; E02D 2300/0087; B32B 3/12; B32B 2305/024; D03D 13/004;
(Continued)

(56) References Cited

U.S. PATENT DOCUMENTS 3,811,287 A * 5/1974 De Winter ............ E02B 3/122
405/19
4,417,828 A 11/1983 de Winter
(Continued)

FOREIGN PATENT DOCUMENTS

CA 2509811 A1 12/2005
WO WO-1998/006570 A1 2/1998

OTHER PUBLICATIONS

ASTM D6525/D6525M-16, Standard Test Method for Measuring Nominal Thickness of Rolled Erosion Control Products, http://www.astm.org/Standards/D6525.htm, Copyright 1996, 2 pages.
(Continued)

*Primary Examiner* — Benjamin F Fiorello
*Assistant Examiner* — Stacy N Lawson
(74) *Attorney, Agent, or Firm* — Harness, Dickey & Pierce, P.L.C.; Anthony G. Fussner

(57) ABSTRACT

Disclosed are exemplary embodiments of turf reinforcement mats that include spun yarns and/or multifilament yarns in either or both of the warp and weft directions.

16 Claims, 5 Drawing Sheets

Related U.S. Application Data filed on Mar. 23, 2016, provisional application No. 62/341,594, filed on May 25, 2016.

(51) Int. Cl.

| | |
|---|---|
| *D03D 15/00* | (2006.01) |
| *E02D 3/00* | (2006.01) |
| *D03D 1/00* | (2006.01) |
| *D03D 13/00* | (2006.01) |
| *D03D 15/04* | (2006.01) |
| *A01G 13/00* | (2006.01) |
| *A01G 13/02* | (2006.01) |
| *D02G 3/02* | (2006.01) |
| *D02G 3/36* | (2006.01) |

(52) U.S. Cl.
CPC ............ *E02B 3/126* (2013.01); *E02D 17/202* (2013.01); *D10B 2101/06* (2013.01); *D10B 2321/021* (2013.01); *D10B 2321/022* (2013.01); *D10B 2331/02* (2013.01); *D10B 2331/04* (2013.01); *D10B 2505/204* (2013.01)

(58) Field of Classification Search
CPC ...... D03D 15/04; D03D 25/005; A01G 24/44; A01G 20/20
USPC ............... 405/16, 19, 302.6, 302.7; 442/181, 442/189–192, 195, 197, 199, 200, 209, 442/213–216
See application file for complete search history.

(56) References Cited

U.S. PATENT DOCUMENTS

| | | | |
|---|---|---|---|
| 4,449,857 A | | 5/1984 | Davis |
| 4,502,815 A | | 3/1985 | Scales et al. |
| 4,815,499 A | | 3/1989 | Johnson |
| 4,837,387 A | * | 6/1989 | van de Pol .............. D03D 1/00 405/302.7 |
| 5,091,247 A | | 2/1992 | Willibey et al. |
| 5,108,224 A | | 4/1992 | Cabaniss et al. |
| 5,567,087 A | | 10/1996 | Theisen |
| 5,616,399 A | | 4/1997 | Theisen |
| 5,651,641 A | | 7/1997 | Stephens et al. |
| 5,735,640 A | | 4/1998 | Meyer et al. |
| 6,129,879 A | | 10/2000 | Bersted et al. |
| 6,179,013 B1 | | 1/2001 | Gulya |
| 6,280,818 B1 | | 8/2001 | Smith et al. |
| 6,502,360 B2 | | 1/2003 | Carr, III et al. |
| 6,506,873 B1 | | 1/2003 | Ryan et al. |
| 7,112,283 B2 | | 9/2006 | Stephens |
| 7,740,420 B2 | | 6/2010 | Jones et al. |
| 7,874,767 B2 | | 1/2011 | Jones et al. |
| 8,088,117 B2 | | 1/2012 | Stephens et al. |
| 8,252,705 B2 | | 8/2012 | King et al. |
| 8,333,220 B2 | | 12/2012 | King |
| 8,598,054 B2 | | 12/2013 | King et al. |
| 2007/0178790 A1 | * | 8/2007 | Gardner ................. D03D 15/00 442/190 |
| 2008/0096017 A1 | * | 4/2008 | Patrick ................... D04H 3/005 428/379 |
| 2008/0182471 A1 | * | 7/2008 | Danzey .................... B66C 1/18 442/199 |
| 2008/0207073 A1 | | 8/2008 | Jones |
| 2009/0208288 A1 | | 8/2009 | Stephens et al. |
| 2011/0027540 A1 | * | 2/2011 | Sutton .................. D03D 13/004 428/175 |
| 2011/0206458 A1 | | 8/2011 | Jones et al. |
| 2011/0250448 A1 | | 10/2011 | Jones et al. |
| 2012/0052759 A1 | | 3/2012 | Wang |
| 2013/0044623 A1 | | 2/2013 | Speight et al. |
| 2013/0199755 A1 | * | 8/2013 | Sawafta ................. E01C 13/08 165/104.11 |
| 2013/0244521 A1 | | 9/2013 | Jones et al. |
| 2014/0099850 A1 | | 4/2014 | King et al. |
| 2014/0241817 A1 | | 8/2014 | Jones et al. |
| 2015/0159305 A1 | | 6/2015 | Booth |

OTHER PUBLICATIONS

ASTM D6818-17, Standard Test Method for Ultimate Tensile Properties of Rolled Erosion Control Products, http://www.astm.org/Standards/D6818.htm, Copyright 1996, 2 pages.

ASTM D7101-13, Standard Index Test Method for Determination of Unvegetated Rolled Erosion Control Product (RECP) Ability to Protect Soil from Rain Splash and Associated Runoff Under Bench-Scale Conditions, http://www.astm.org/Standards/D7101.htm, Copyright 1996, 2 pages.

ASTM D7322/D7322M-16e1, Standard Test Method for Determination of Rolled Erosion Control Product (RECP) Ability to Encourage Seed Termination and Plant Growth Under Bench-Scale Conditions, http://www.astm.org/Standards/D7322.htm, Copyright 1996, 2 pages.

ASTM D7207-05, Standard Test Method for Determination of Unvegetated Rolled Erosion Control Product (RECP) Ability to Protect Sand from Hydraulically-Induced Shear Stresses under Bench-Scale Conditions (Withdrawn 2014), http://www.astm.org/DATABASE.CART/WITHDRAWN/d7207.htm, Copyright 1996, 2 pages.

Canadian Office Action for Canadian application No. 2957754 filed Feb. 10, 2017 dated Mar. 21, 2018, 5 pages.

Non-final Office Action for U.S. Appl. No. 15/673,552, filed Feb. 6, 2017 which names the same inventors as the instant application but is not related through a priority claim, dated Jul. 27, 2018, 19 pages.

\* cited by examiner

TURF REINFORCEMENT MATS

CROSS-REFERENCE TO RELATED APPLICATIONS

This application claims the benefit of and priority to:
(1) U.S. Provisional Application No. 62/294,096 filed Feb. 11, 2016; and
(2) U.S. Provisional Application No. 62/312,039 filed Mar. 23, 2016; and
(3) U.S. Provisional Application No. 62/341,594 filed May 25, 2016.

The entire disclosure of each of the above applications is incorporated herein by reference.

FIELD

The present disclosure relates to turf reinforcement mats.

BACKGROUND

This section provides background information related to the present disclosure which is not necessarily prior art.

Turf reinforcement mats may be used for soil reinforcement, retention, stabilization, erosion control, support for vegetation and/or mulch, etc. A turf reinforcement mat may include warp and weft yarns interwoven together with the warp yarns inserted over-and-under the weft yarns (or vice versa) to thereby secure the yarns together. For example, FIG. 1 shows a portion of a conventional turf reinforcement mat 10 having monofilament yarns 14 in the warp direction (from top to bottom in FIG. 1) and monofilament yarns 18 in the weft or fill direction (from left to right in FIG. 1).

DRAWINGS

The drawings described herein are for illustrative purposes only of selected embodiments and not all possible implementations, and are not intended to limit the scope of the present disclosure.

DETAILED DESCRIPTION

Figure 1:
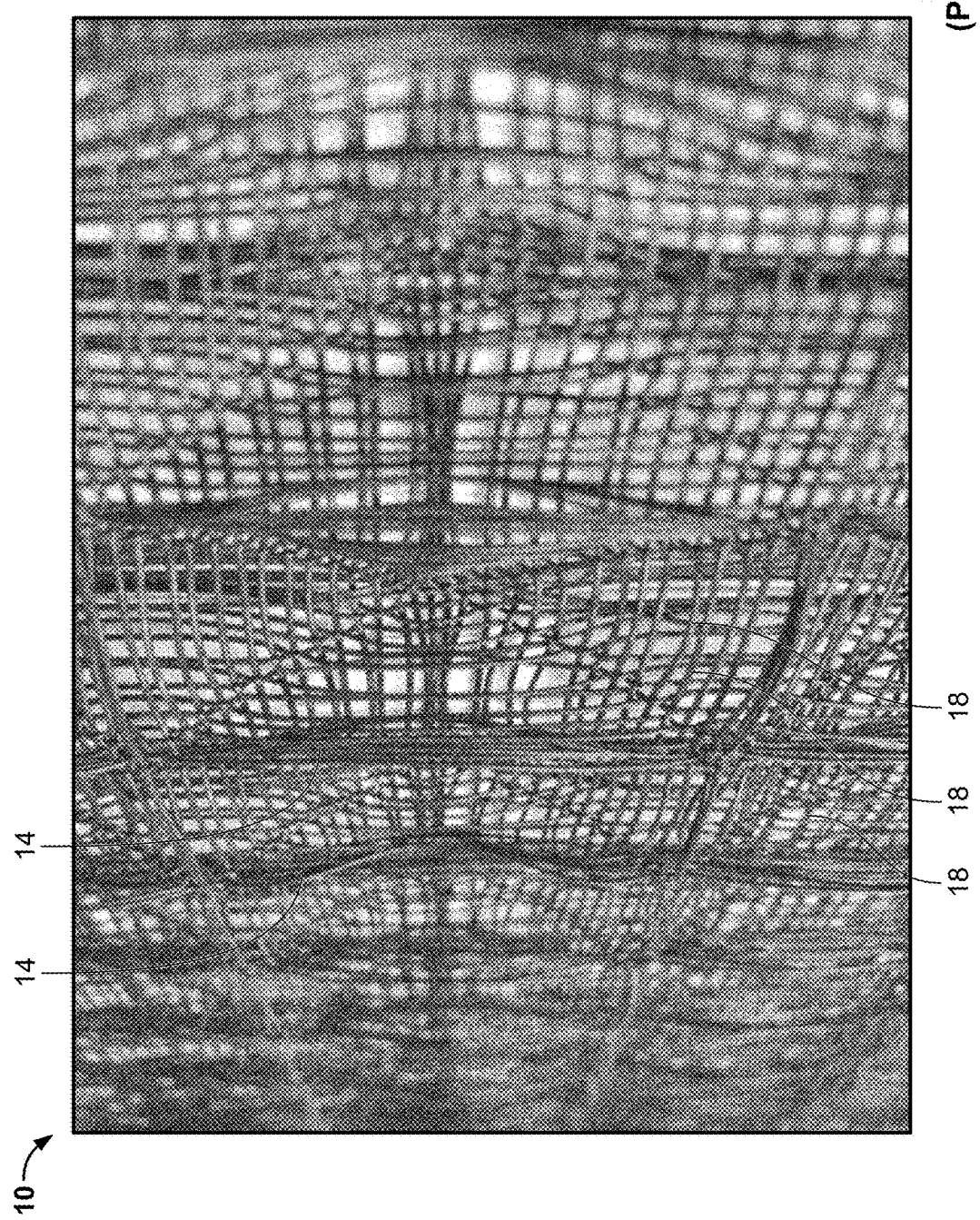
FIG. 1 shows a portion of a conventional turf reinforcement mat.

Example embodiments will now be described more fully with reference to the accompanying drawings.

Disclosed herein are exemplary embodiments of turf reinforcement mats that include spun yarn (e.g., core-sheath spun yarn, ring-spun yarn, rotor-spun yarn, open-end spun yarn, etc.) and/or multifilament yarns (e.g., polypropylene multifilament yarn, polyethylene terephthalate (PET) multifilament yarn, etc.) in either or both of the warp and weft directions. The inventors hereof have recognized that spun yarns and/or multifilament yarns have an enhanced ability to capture and retain sediment and water, such that the use of spun yarns and/or multifilament yarns can improve performance of a turf reinforcement mat.

As shown by rows 1, 2, and 3 in the table below, exemplary embodiments of a turf reinforcement mat may include spun yarn in the warp direction and monofilament yarn, multifilament yarn, or spun yarn in the weft direction. As shown by rows 4 and 5 in the table below, exemplary embodiments of a turf reinforcement mat may include monofilament yarn in the warp direction and spun yarn or multifilament yarn in the weft direction. As shown by rows 6, 7, and 8 in the table below, exemplary embodiments of a turf reinforcement mat may include multifilament yarn in the warp direction and spun yarn, monofilament yarn, or multifilament yarn in the weft direction.

| Row | Warp Yarn | Weft Yarn |
| --- | --- | --- |
| 1 | Spun | Monofilament |
| 2 | Spun | Multifilament |
| 3 | Spun | Spun |
| 4 | Monofilament | Spun |
| 5 | Monofilament | Multifilament |
| 6 | Multifilament | Spun |
| 7 | Multifilament | Monofilament |
| 8 | Multifilament | Multifilament |

A turf reinforcement mat may include core-sheath spun yarn (or other spun yarn) in the warp direction but not the weft direction. In the weft direction, the turf reinforcement mat may include multifilament yarn and/or monofilament yarn. In this first example, the turf reinforcement mat may consist of only core-sheath spun yarn in the warp direction and only multifilament and/or monofilament yarn in the weft direction. Or, for example, a turf reinforcement mat may include core-sheath spun yarn (or other spun yarn) in the weft direction but not the warp direction. In the warp direction, the turf reinforcement mat may include multifilament yarn and/or monofilament yarn. In this second example, the turf reinforcement mat may consist of only core-sheath spun yarn in the weft direction and only multifilament and/or monofilament yarn in the warp direction. As another example, a turf reinforcement mat may include core-sheath spun yarn in both the warp and weft directions. In this third example, the turf reinforcement mat may consist of only core-sheath spun yarn in both the weft and warp directions. As a further example, a turf reinforcement mat may include multifilament yarn in both the warp and weft directions. In this fourth example, the turf reinforcement mat may consist of only multifilament yarn in both the weft and warp directions. As yet another example, a turf reinforcement mat may include multifilament yarn in the weft direction but not the warp direction. In the warp direction, the turf reinforcement mat may include monofilament yarn. In this fifth example, the turf reinforcement mat may consist of only multifilament yarn in the weft direction and only monofilament yarn in the warp direction. As yet a further example, a turf reinforcement mat may include multifilament yarn in the warp direction but not the weft direction. In the weft direction, the turf reinforcement mat may include monofilament yarn. In this sixth example, the turf reinforcement mat may consist of only multifilament yarn in the warp direction and only monofilament yarn in the weft direction. Alternatively, the example turf reinforcement mats described above may additionally include one or more other yarns in either or both of the warp and weft directions.

In the above examples, the core-sheath spun yarn may include a polypropylene core having a denier about 1800 and a polypropylene fiber sheath having a denier about 1500. The polypropylene core and polypropylene fiber sheath may each have a round (e.g., circular or substantially circular, etc.) cross section. Also in the above examples, the turf reinforcement mat may include a high tenacity polyethylene terephthalate (PET) multifilament yarn having a denier of about 2500 instead of, or in addition to, the core-sheath spun yarn. The high tenacity polyethylene terephthalate (PET) multifilament yarn may have a round (e.g., circular or substantially circular, etc.) cross section. Alternatively, other yarns may be used in other exemplary embodiments, such as yarns with higher or lower denier (e.g., core yarns of 100 denier to 11,000 denier that are single strands or bundled into strands of two or more strands, etc.), yarns with other cross-sectional shapes or geometries (e.g., noncircular, oval-shaped, etc.), yarns made out of other materials, tape yarns, fibrillated yarns, etc. Also, the warp and weft yarns may have the same denier, or they may have deniers different from each other.

When core-sheath spun yarns are used, the core yarns may range from a total of 100 denier to 11,000 denier each. For example, core yarns of 100 denier to 11,000 denier that are single strands or bundled into strands of two or more strands may be used in exemplary embodiments. The core yarns may be comprised of polyethylene polymers, polypropylene polymers, polyesters, nylons, fiberglass, polyphenylene oxide, natural and/or synthetic fibers, other synthetic or natural raw material(s), etc. The sheath fibers may be made from polypropylene, polyethylene, polyester, nylon, rayon, different terpolymers, acrylic, aramid fibers, natural and/or synthetic fibers, other synthetic or natural raw material(s), etc. For a core-sheath spun yarn, the sheath weight percentage compared to the total weight of the yarn may range from about 10% to about 99% in exemplary embodiments. Alternatively, other core-sheath spun yarns may be used in other exemplary embodiments.

In exemplary embodiments that include spun yarn in either or both of the warp and weft directions, the spun yarn may include relatively short filaments or staple fibers from 1 denier per filament (dpf) to 60 dpf. The short filaments or staple fibers may be spun, entangled, twisted, etc., together to form a larger yarn. The short filaments or staple fibers may also be utilized in a core-sheath spun yarn where single or multiple yarns for a core structure are encapsulated in a single or multiple (e.g., 1 to 1 to 6, etc.) blend of fibers around the core.

By way of example only, core-sheath spun yarns may be made by Dref spinning, ring spinning, rotor spinning, open-end spinning, etc. But aspects of the present disclosure should not be limited to any single type of manufacturing process for making spun yarns and/or multifilament yarns as spun yarns and/or multifilament yarns may be made by different manufacturing processes.

As noted above, a turf reinforcement mat may include a high tenacity polyethylene terephthalate (PET) multifilament yarn having a denier of about 2500 instead of, or in addition to, the core-sheath spun yarn. The high tenacity polyethylene terephthalate (PET) multifilament yarn may have a round (e.g., circular or substantially circular, etc.) cross section. Alternatively, other multifilament yarns may be used in other exemplary embodiments, such as multifilament yarns with other cross-sectional shapes or geometries (e.g., noncircular, oval-shaped, etc.), multifilament yarns made out of other materials (e.g., polypropylene, polyethylene, polyester, nylon, rayon, different terpolymers, acrylic, aramid fibers, other raw material(s), etc.), and/or multifilament yarns with a denier higher or lower than 2500, etc.

As recognized by the inventors hereof, advantages of using spun yarns and/or multifilament yarn in a turf reinforcement mat are that the filament fibers and/or core structure of the yarns can be configured (e.g., engineered, designed, etc.) to achieve the strength needed in the turf reinforcement mat while the fiber can be configured (e.g., engineered, designed, etc.) to achieve the appearance and functional properties desired. Multifilament yarns and spun yarns (e.g., the core and/or the sheath fiber, etc.) can be enhanced or treated for UV resistance, flame retardance, water absorption, tackiness, and/or other desirable properties. Additionally, or alternatively, some exemplary embodiments may include yarns (e.g., multifilament yarns, spun yarns, the core and/or the sheath fiber, etc.) treated with seeds and/or fertilizers. It is noted, however, that the yarns do not necessarily need or require a core structure in all embodiments as some exemplary embodiments include yarns without any core structure.

As disclosed herein, the turf reinforcement mat may include one or more different types of yarn, such as multifilament and/or spun yarns in either or both the weft and warp directions. The turf reinforcement mat may be formed by layers of warp and weft yarns secured or interwoven together in a weave, construction, or pattern, which helps to enhance water flow and strength characteristics. The warp and weft yarns may be configured such that the turf reinforcement mat has a three-dimensional shape. For example, the turf reinforcement mat may have a plurality of portions or cells each having a pyramidal or honeycomb shape. By way of example, a turf reinforcement mat may have a plain weave, a twill weave (e.g., 2×2, 3×3, 2×1, 4×4, etc.), satin weave, pyramidal weave, etc. For example, warp yarns may be interwoven with the weft yarns such that the warp yarns cross over and then under more than one weft yarn (e.g., three weft yarns, two weft yarns, etc.). The warp and weft yarn systems may comprise one, two, three or more different types of yarns, e.g., multifilament yarns and/or spun yarns with different cross-sectional shapes or geometries, monofilaments, tape yarns, fibrillated yarns, etc.

In some exemplary embodiments, a turf reinforcement mat may include multifilament and/or spun yarns in either the weft or warp direction and monofilament yarn (e.g., polypropylene monofilament, polyester monofilament, polyethylene monofilament, nylon monofilament, combinations thereof, etc.) in the other weft or warp direction. By way of example, one particular exemplary embodiment of a turf reinforcement mat includes polypropylene monofilament yarns in the warp direction and core-sheath spun yarns in the weft direction, where the yarns are configured such that the turf reinforcement mat has a three dimensional shape (e.g., pyramidal or honeycomb shape, etc.). Alternative embodiments may include a turf reinforcement mat that includes other types of yarns in the warp direction and/or weft direction besides polypropylene monofilament yarns, such as multifilament yarns, spun yarns, other monofilament yarns, fibers, threads, other yarn types such as tape yarns and/or fibrillated yarns, etc.

In exemplary embodiments, the warp yarns and weft yarns may have the same cross-sectional shape. In one particular embodiment, the weft yarns and the warp yarns have a round, substantially circular cross-sectional shape. Alternatively, other embodiments may include warp and weft yarns that have cross-sectional shapes or geometries different than the cross-sectional shapes or geometries of the weft yarns. For example, the warp or weft yarns may have a round, substantially circular cross-sectional shape, while the other one of the warp or weft yarns has an oval cross-sectional shape with a width greater than its thickness or height. Alternative embodiments may include a turf reinforcement mat having warp and/or weft yarns with other or additional cross-sectional shapes, geometries, and/or sizes. For example, the warp and weft yarns may both have an oval cross-sectional shape.

In exemplary embodiments, the turf reinforcement mat may consist of a single warp set/system and a single weft set/system. In this example, either or both of the first/warp system and the second/weft system may include multifilament yarns and/or spun yarns as disclosed herein. The first and second (or warp and weft) sets of yarns may be interwoven together to form a dimensionally stable network, which allows the yarns to maintain their relative position. By way of example only, the weft system may comprise core-sheath spun yarns including a polypropylene core with a denier of about 1800 and a polypropylene fiber sheath with a denier of about 1500. The core and the sheath may each have a rounded or substantially circular cross-sectional shape. The warp system may comprise a high tenacity polyethylene terephthalate (PET) multifilament or monofilament yarn having a denier of about 2500 or more and a rounded or substantially circular cross-sectional shape.

Figure 2:
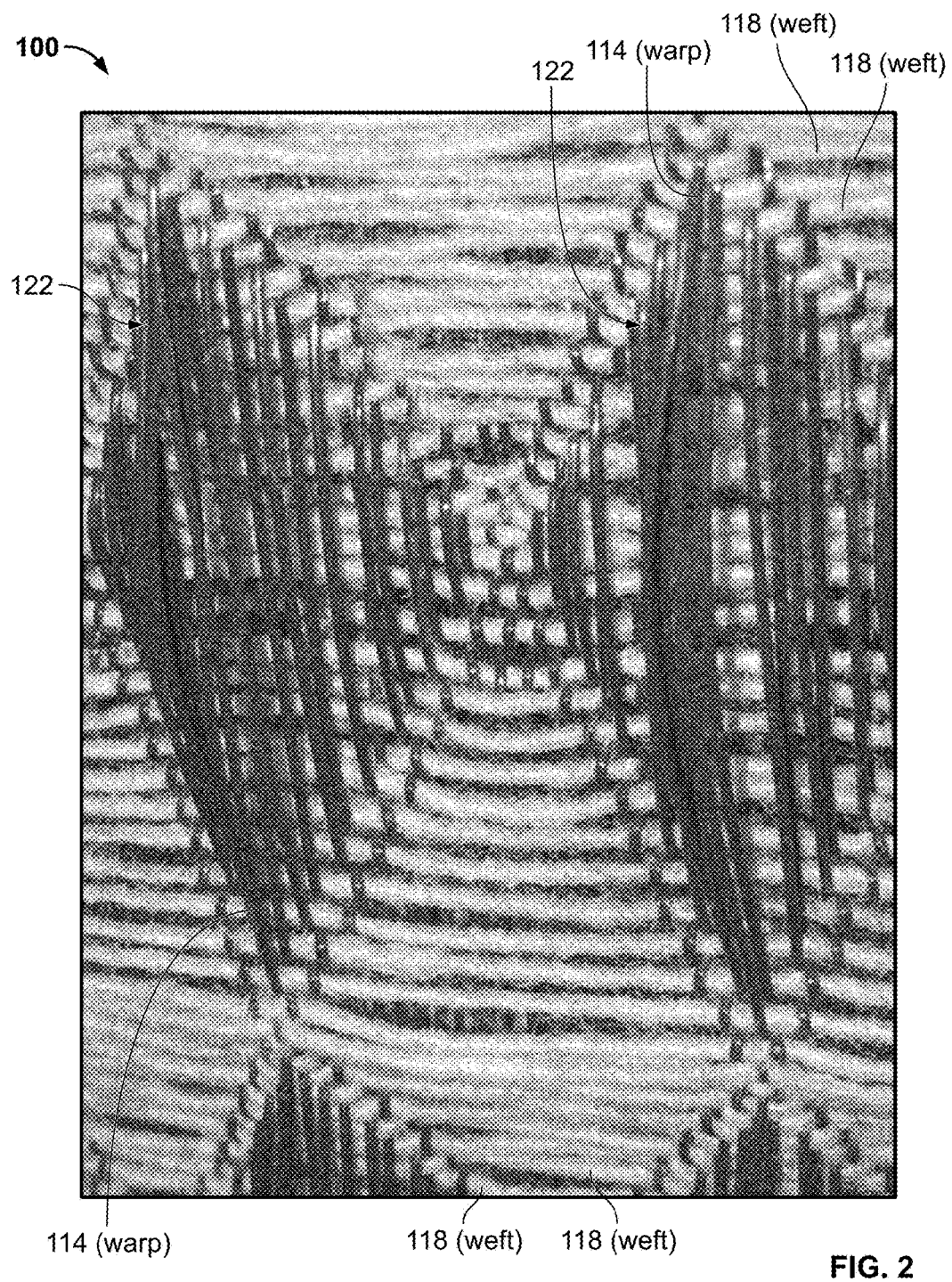
FIGS. 2 through 4 show portions of a turf reinforcement mat according to an exemplary embodiment that includes core-sheath spun yarn in the weft direction and polypropylene monofilament yarn in the warp direction.
Figure 3:
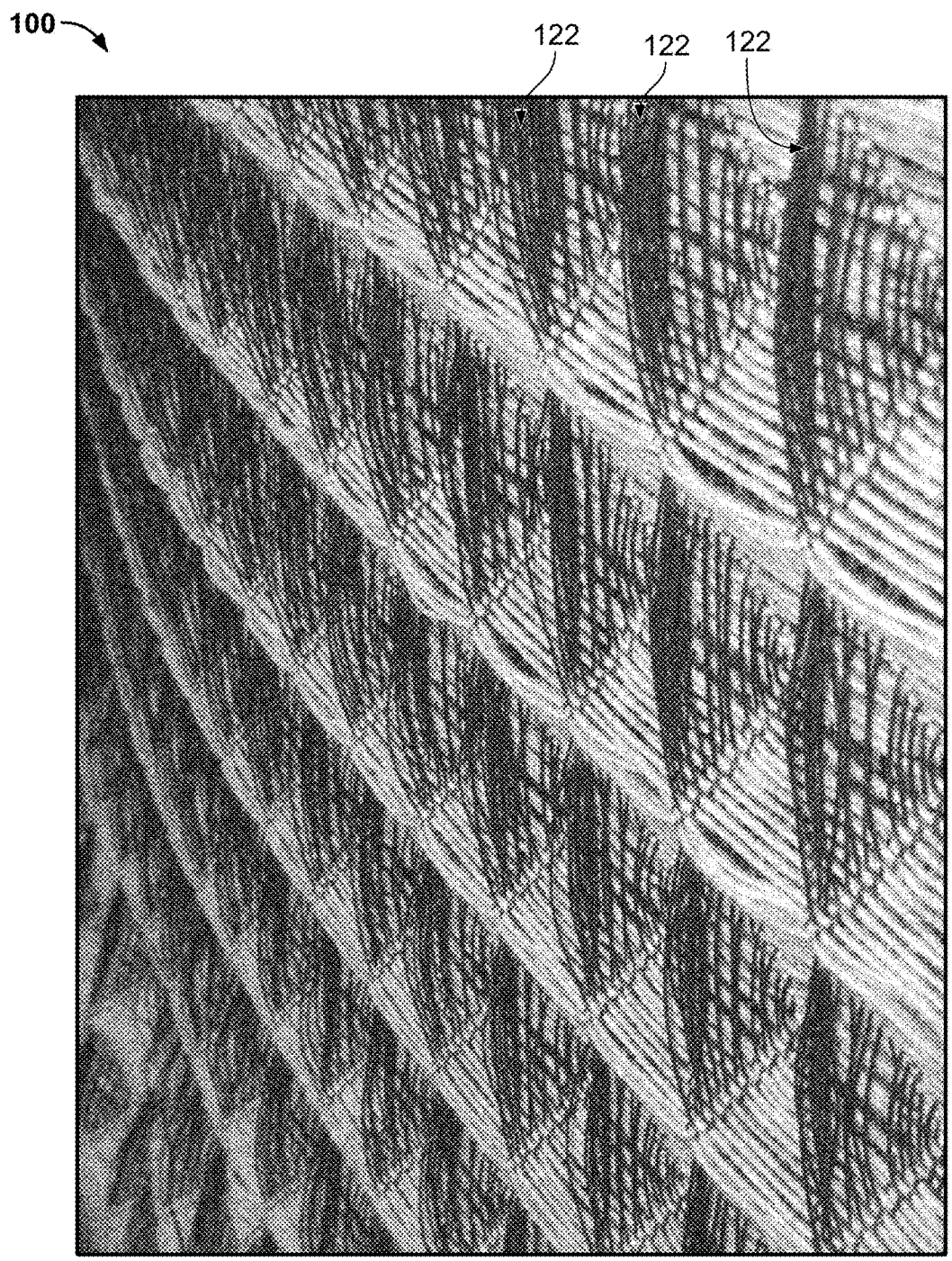
Figure 4:
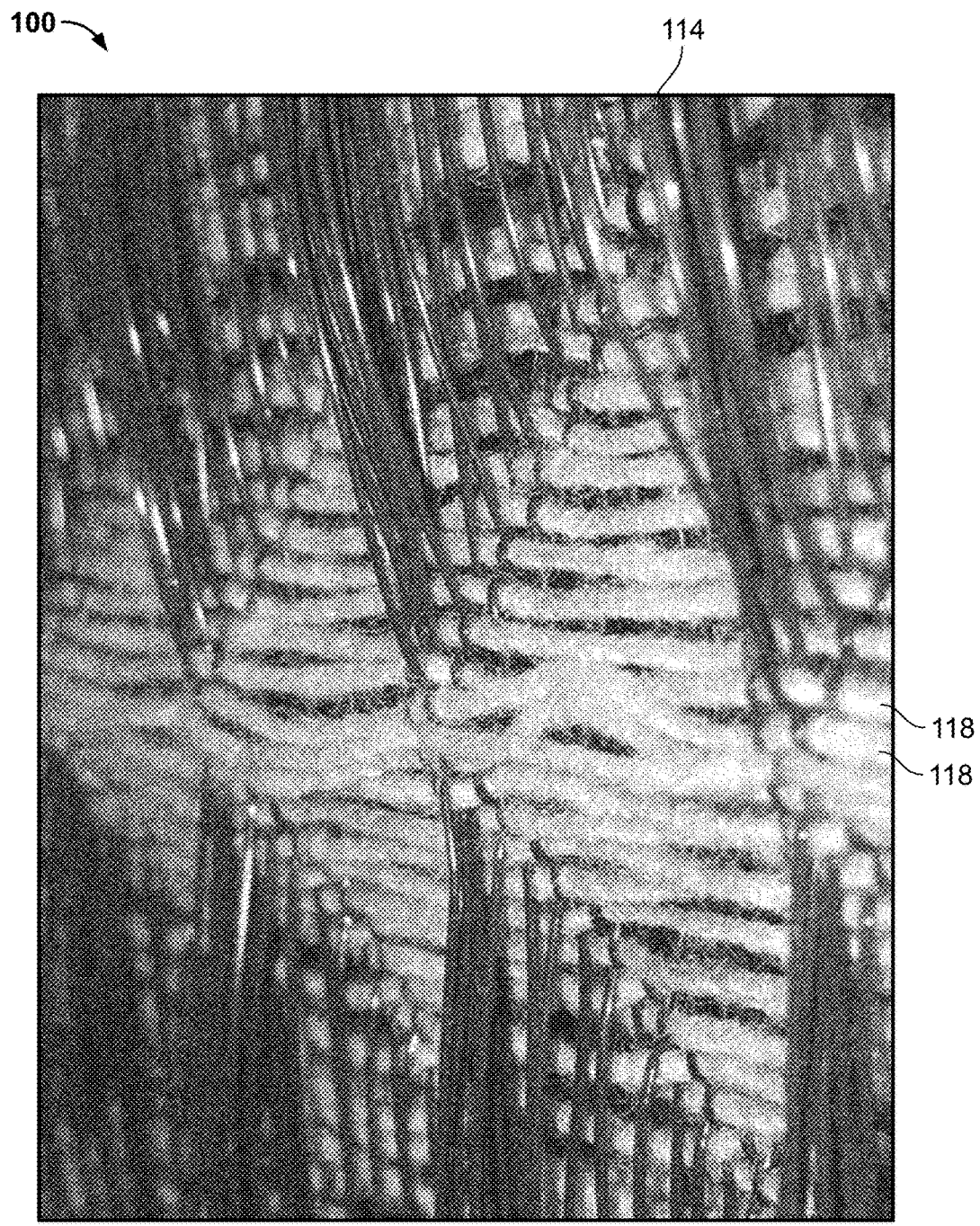

With reference now to the figures, FIGS. 2 through 4 illustrate an exemplary embodiment of a turf reinforcement mat 100 embodying one or more aspects of the present disclosure. As shown, the turf reinforcement mat 100 includes warp yarns 114 in the warp direction (from top to bottom in FIG. 2) and weft yarns 118 in the weft direction (from left to right in FIG. 2). The yarns 114, 118 may be configured such that the turf reinforcement mat 100 has a three dimensional shape. For example, the turf reinforcement mat 100 may have a plurality of portions or cells 122 defined by the warp and weft yarns 114, 118 that have pyramidal or honeycomb shapes protruding upwardly or downwardly relative to the turf reinforcement mat 100.

In this exemplary embodiment, the turf reinforcement mat 100 includes monofilament yarns 114 (shown in green in FIGS. 2-4) in the warp direction and core-sheath spun yarns 118 (shown in white in FIGS. 2-4) in the weft direction. In alternative embodiments, the turf reinforcement mat 100 may include core-sheath spun yarn in the warp direction and monofilament yarn in the weft direction. In other embodiments, the turf reinforcement mat 100 may include core-sheath spun yarn in both the warp direction and the weft direction. In still other embodiments, the turf reinforcement mat 100 may include multifilament yarn in both the warp direction and the weft direction. In yet other embodiments, the turf reinforcement mat 100 may include other spun yarns in either or both the warp and weft directions, multifilament yarns in either or both of the warp and weft directions, and/or other monofilament yarns in the warp and/or weft directions.

By way of example only, the monofilament yarns 114 may comprise polypropylene monofilament yarn, polyethylene terephthalate (PET) monofilament yarn, etc. In one particular example, the monofilament yarns 114 comprise high tenacity polyethylene terephthalate (PET) monofilament yarn having a round (e.g., circular or substantially circular, etc.) cross section and having a denier of about 2500. Alternatively, other yarns may be used in other exemplary embodiments, such as multifilament yarns, other monofilament yarns with denier higher or lower than 2500, yarns with other cross-sectional shapes or geometries (e.g., non-circular, oval-shaped, etc.), yarns made out of other materials, tape yarns, fibrillated yarns, etc.

Also by way of example only, the core-sheath spun yarns 118 may range from a total of 100 denier to 11,000 denier each. For example, core yarns of 100 denier to 11,000 denier that are single strands or bundled into strands of two or more strands may be used in exemplary embodiments. The core yarns may be comprised of polyethylene polymers, polypropylene polymers, polyesters, nylons, fiberglass, polyphenylene oxide, natural and/or synthetic fibers, other synthetic or natural raw material(s), etc. The sheath fibers may be made from polypropylene, polyethylene, polyester, nylon, rayon, different terpolymers, acrylic, aramid fibers, natural and/or synthetic fibers, other synthetic or natural raw material(s), etc. The sheath weight percentage compared to the total weight of the yarn may range from about 10% to about 99%. The core-sheath spun yarn may include relatively small filaments or staple fibers that are from 1 denier per filament (dpf) to 60 dpf. The short filaments or staple fibers may be spun, entangled, twisted, etc., together to form single or multiple yarns for the core structure, which are encapsulated in a single or multiple (e.g., 1 to 1 to 6, etc.) blend of fibers around the core. The core-sheath spun yarns may be made by a process known as Dref spinning. In one particular example, the core-sheath spun yarns 118 may comprise a polypropylene core having a denier about 1800 and a polypropylene fiber sheath having a denier about 1500. The polypropylene core and polypropylene fiber sheath may each have a round (e.g., circular or substantially circular, etc.) cross section. Alternatively, other spun yarns may be used in other exemplary embodiments, such as spun yarns with or without a core, spun yarns with higher or lower denier, spun yarns with other cross-sectional shapes or geometries (e.g., noncircular, oval-shaped, etc.), spun yarns made out of other materials, spun yarns made via other processes besides Dref spinning (e.g., rotor spinning, ring spinning, open-end spinning, etc.), etc.

Figure 5:
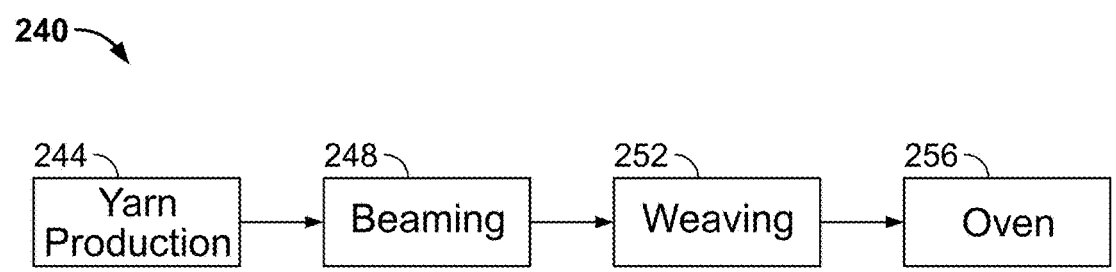
FIG. 5 is a process flow diagram representing an exemplary manufacturing process or method of making a turf reinforcement mat according to exemplary embodiments.

FIG. 5 is a process flow diagram representing an exemplary manufacturing process or method 240 of making a turf reinforcement mat (e.g., turf reinforcement mat 100 shown in FIGS. 2 to 4, etc.) according to exemplary embodiments. Generally, the method 240 includes four operations or steps labeled as yarn production 244, beaming 248, weaving 252, and oven 256 in FIG. 5.

By way of background, single strand yarns may be produced from plastic resin pellets. The pellets are introduced to a plastic extrusion machine, which heats the pellets to a high enough temperature to transform the pellets into a molten state. At this point, additives (e.g., color or other substances, etc.) may be introduced along with the plastic pellets to achieve desired characteristics of the yarn. The molten plastic is then forced through a hole in a die to create a continuous strand. The shape of the hole governs the shape of the strand. The molten strand is then quenched to become solid again. The solid state strand is then stretched, e.g., from 5 times to 12 times, to achieve appropriate physical properties. After it is stretched, the yarn strand is then wound onto a tube for later use.

In the first operation or step 244 of method 240, multifilament yarns may be extruded in a similar manner as described above for single strand yarns. With multifilament yarns, however, the individual holes in the die are typically smaller. The individual continuous strands of filaments are bundled, twisted, textured, bulked, etc. together to form a heavier weight yarn. The yarn bundle may then be exposed to a number of other processes (e.g., twisting, etc.) to enhance the yarn properties.

Alternatively, the first operation or step 244 may include manufacturing spun yarns from cut lengths of plastic fibers or relatively short staple fibers. The short staple fibers are entangled among themselves or around a core yarn(s) to form a single strand of yarn.

After the yarns are manufactured at the first operation or step 244, the yarns may then proceed to the second operation or step 248 where the yarns are processed into either warp yarns or weft yarns for a turf reinforcement mat. First, individual packages of yarn may be loaded onto a creel and then transferred to a single loom beam. These yarns are generally referred to as warp yarns. A loom beam may contain thousands of individual warp yarns. The loom beam becomes the source in the loom for the machine direction yarns. Other yarns may then be inserted on the loom in the cross machine direction. These other yarns are generally known as weft or fill yarns. In an alternative process, the beaming process may be bypassed and looms can be fed directly from a creel.

At the third operation or step 252, a weaving machine, commonly called a loom, is loaded with the loom beam and the weft yarns mentioned above. The weaving machine may then interlace the yarns in a woven method.

After the yarns are woven, the woven fabric may then be processed through a finishing oven at the fourth operation of process 256. The heat in the oven may heat shrink and cause shrinkage of the warp and weft yarns within the turf reinforcement mat to achieve the desired characteristics (e.g., three dimensional, pyramidal, honey comb, or cuspated profile shape, etc.) of the finished turf reinforcement mat. For example, the warp and weft yarns may have heat shrinkage characteristics such that when heated, the warp and weft yarns form a three-dimensional, pyramidal, honey comb, or cuspated shape.

The method 240 shown in FIG. 5 and described above is provided for purpose of illustration only as a turf reinforcement mat may be made by other processes. For example, another exemplary embodiment may include a turf reinforcement mat including spun yarn and/or multifilament yarn in either or both of the warp and weft directions where the turf reinforcement mat is made by a different process.

Exemplary embodiments disclosed herein may provide one or more (but not necessarily any or all) of the following features. For example, an exemplary embodiment of turf reinforcement mat disclosed herein may have good or satisfactory sediment and water retention rates and corresponding germination rates. An exemplary embodiment of a turf reinforcement mat disclosed herein may be used in a wide range of applications, such as for soil reinforcement, retention, stabilization, erosion control, support for vegetation and/or mulch, etc.

To better examine the benefit of this invention, bench scale tests were conducted for comparative purposes. These tests are commonly recognized by the Erosion Control Technology Council (ECTC) for evaluation of rolled erosion control products (RECP). A turf reinforcement mat is a type of RECP. A turf reinforcement mat disclosed herein according to this invention is referred to in the tables below as TRM-A. Other commonly available turf reinforcement mats available to the market are referred to as TRM-B utilizing round cross section monofilament yarns and TRM-C utilizing multi-lobe cross section monofilament yarns. Table I below compares the strength and thickness of these turf reinforcement mats.

TABLE I

| Physical Characteristics | | | | | |
|---|---|---|---|---|---|
| | ASTM Method | Test Unit | TRM-A | TRM-B | TRM-C |
| Ultimate Tensile Strength - MD | ASTM D 6818 | lbs/ft | 5375 | 4006 | 4358 |
| Ultimate Tensile Strength - XMD | ASTM D 6818 | lbs/ft | 3648 | 3124 | 3118 |
| Thickness | ASTM D 6525 | mils | 534 | 251 | 389 |

The first procedure is "Standard Index Test Method for the Determination of Unvegetated Rolled Erosion Control Product (RECP) Ability to Protect Soil from Rain Splash and Associated Runoff Under Bench-Scale Conditions". The exact test method is documented under ASTM D 7101. The test evaluates a RECP ability to reduce rain splash and runoff induced erosion under bench-scale conditions in a laboratory.

TABLE II

| Bench-Scale Rain Splash and Runoff | | | | | | % Imp. of TRM-A | |
|---|---|---|---|---|---|---|---|
| | ASTM Method | Test Unit | TRM-A | TRM-B | TRM-C | vs. TRM-B | vs. TRM-C |
| 50 mm (2 in.)/hr | ASTM D 7101 | Soil Loss Ratio* | 19.82 | 4.05 | 6.83 | 389.4% | 190.2% |
| 100 mm (4 in.)/hr | ASTM D 7101 | Soil Loss Ratio* | 16.66 | 4.71 | 6.13 | 253.7% | 171.8% |
| 150 mm (6 in.)/hr | ASTM D 7101 | Soil Loss Ratio* | 10.46 | 5.46 | 5.51 | 91.6% | 89.8% |

*Soil Loss Ratio = soil loss of unprotected surface (i.e., control) divided by soil loss with protected surface = 1/C-Factor In regard to the data in Table II, the fabric disclosed as TRM-A according to this invention is significantly better at protecting soil as compared to standard TRM-B products with round cross section monofilament yarns or TRM-C products with multi-lobe cross section monofilament yarns.

The second procedure is "Standard Index Test Method For the Determination of Unvegetated Rolled Erosion Control Product (RECP) Ability To Protect Soil From Hydraulically-Induced Shear Stresses Under Bench-Scale Conditions". The exact test method is documented under ASTM D 7207. The test method evaluates a RECP ability to protect unvegetated soil from flow induced erosion.

TABLE III

Bench Scale Shear Testing

| TRM-A | | TRM-B | | TRM-C | |
|---|---|---|---|---|---|
| Shear Stress (psf) | Average Soil Loss (g) | Shear Stress (psf) | Average Soil Loss (g) | Shear Stress (psf) | Average Soil Loss (g) |
| 1.49 | 8.3 | 3.80 | 426.7 | 3.53 | 183.3 |
| 3.02 | 106.7 | 4.72 | 533.3 | 4.38 | 300 |
| 5.40 | 253.3 | 5.70 | 663.3 | 5.23 | 855 |

In exemplary embodiments disclosed herein, the nature of the yarns used in either or both the warp and weft directions can greatly reduce sediment movement when exposed to high amounts of water flow. Table III above indicates a significantly different amount of soil loss when these fabrics are compared. When comparing the highest rates of shear from the data available, soil loss from TRM-A was 62% better than TRM-B with round cross section monofilament yarns and 70% better than TRM-C with multi-lobe cross section monofilament yarns.

The third procedure is "Standard Index Test Method For the Determination of Temporary Degradable RECP Performance In Encouraging Seed Germination and Plant Growth Under Bench-Scale Conditions". The exact test method is documented under ASTM D 7322. This test method evaluates the effect of a RECP on seed germination and initial plant growth within a controlled environment.

TABLE IV

Encouraging Seed Germination and Growth

| | Test Unit | TRM-A | TRM-B | TRM-C |
|---|---|---|---|---|
| Plant Mass per Area | % of Control | 254% | 552% | 273% |

As indicated in Table II and Table III, the fabric disclosed according to this invention as TRM-A is significantly better at protection of the soil when exposed to environmental conditions. This protection can be accomplished by covering the soil completely with a number of products that form a barrier between the environment and the soil. However, in these cases, the product will not allow for plant growth. As noted in Table IV, TRM-A while being significantly better at soil protection as compared to TRM-B or TRM-C, allows for significant plant growth.

Moisture is essential in the process of seed germination. The fabric described here as TRM-A significantly absorbs and holds moisture in place better than typical TRM fabrics. In order to prove this, a test method documented as Testing Nonwoven Fabrics ASTM D 1117 was used to determine the absorption capacity of the fabrics.

TABLE V

Ability to Absorb Moisture

| | Test Unit | TRM-A | TRM-B | TRM-C |
|---|---|---|---|---|
| Moisture Absorption | % Change | 150.65% | 46.50% | 14.00% |

As indicated in Table V, the fabric TRM-A is significantly better at absorbing and retaining moisture as compared to standard TRM-B products with round cross section monofilament yarns or TRM-C with multi-lobe cross section monofilament yarns.

In exemplary embodiments, the design of the fabric allows the turf reinforcement to have a higher degree of slip resistance. This feature is important in two ways. First, this characteristic will allow installers to walk on the turf reinforcement mat with better traction during installation. Second, the nature of the materials allows improved adhesion between the turf reinforcement mat and the soil underneath so that the turf reinforcement mat remains in place during critical stages of vegetative development.

In exemplary embodiments disclosed herein, the nature of the yarns used in either or both the warp and weft directions can greatly reduce sediment movement when exposed to high amounts of water flow.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turf reinforcement mat configured for placement on soil for erosion control, the turf reinforcement mat comprising spun yarn in at least one of a warp direction and a weft direction, wherein:
   the spun yarn comprises core-sheath spun yarn in one of the warp direction or the weft direction, but not both;
   the turf reinforcement mat comprises polypropylene or polyethylene terephthalate monofilament yarn in the other one of the warp direction or the weft direction, the polypropylene or polyethylene terephthalate monofilament yarn having a round cross section;
   the core-sheath spun yarn is interwoven with the polypropylene or polyethylene terephthalate monofilament yarn such that the turf reinforcement mat has a pyramidal weave; and
   the core-sheath spun yarn comprises a polypropylene monofilament core having a round cross section and a polypropylene or polyester fiber sheath having a round cross section.

2. The turf reinforcement mat of claim 1, wherein the turf reinforcement mat consists of only:
   the core-sheath spun yarn in the warp direction and the polypropylene or polyethylene terephthalate monofilament yarn in the weft direction; or
   the polypropylene or polyethylene terephthalate monofilament yarn in the warp direction and the core-sheath spun yarn in the weft direction.

3. The turf reinforcement mat of claim 1, wherein the turf reinforcement mat is configured for ultraviolet (UV) resistance.

4. The turf reinforcement mat of claim 1, wherein the core-sheath spun yarn includes the polypropylene fiber sheath.

5. The turf reinforcement mat of claim 1, wherein:
   the core-sheath spun yarn is in the weft direction;
   the polypropylene or polyethylene terephthalate monofilament yarn is in the warp direction;
   the polypropylene monofilament core has a denier of about 1800; and
   the polypropylene or polyester fiber sheath has a denier of about 1500.

6. The turf reinforcement mat of claim 1, wherein:
   the core-sheath spun yarn has a total of 100 denier to 11,000 denier; and
   a sheath weight percentage compared to a total weight of the core-sheath spun yarn ranges from about 10% to about 99%; and
   the core-sheath spun yarn includes filaments having 1 denier per filament to 60 denier per filament, and the filaments are coupled together to form a single or multiple yarns for a core, which are encapsulated in a single fiber or a blend of multiple fibers around the core.

7. The turf reinforcement mat of claim 1, wherein:
   the turf reinforcement mat is configured to allow plant growth through the turf reinforcement mat.

8. The turf reinforcement mat of claim 1, wherein the turf reinforcement mat is configured to reduce rain splash and runoff induced erosion, whereby the turf reinforcement mat has a soil loss ratio according to ASTM D 7101 of:

19.82 for 50 millimeters/hour; and/or
16.66 for 100 millimeters/hour; and/or
10.46 for 150 millimeters/hour.

9. The turf reinforcement mat of claim 1, wherein the turf reinforcement mat is configured to protect unvegetated soil from flow induced erosion, whereby the turf reinforcement mat has an average soil loss according to ASTM D 7207 of:
    8.3 grams at a shear stress of 1.49 pounds square foot; and/or
    106.7 grams at a shear stress of 3.02 pounds square foot; and/or
    253.3 grams at a shear stress of 5.40 pounds square foot.

10. A turf reinforcement mat configured for placement on soil for erosion control, the turf reinforcement mat comprising weft yarns and warp yarns interwoven with the weft yarns and configured to allow plant growth through the turf reinforcement mat, wherein:
    the weft yarns and the warp yarns are interwoven such that the turf reinforcement mat has a pyramidal weave;
    one of the warp yarns or the weft yarns, but not both, comprise core-sheath spun yarn;
    the other one of the weft yarns or the warp yarns comprise polypropylene or polyethylene terephthalate monofilament yarn having a round cross section; and
    the core-sheath spun yarn comprises a polypropylene monofilament core having a round cross section and a polypropylene or polyester fiber sheath having a round cross section.

11. The turf reinforcement mat of claim 10, wherein:
    the warp yarns consist of only the core-sheath spun yarn and the weft yarns consist of only the polypropylene or polyethylene terephthalate monofilament yarn; or
    the warp yarns consist of only the polypropylene or polyethylene terephthalate monofilament yarn and the weft yarns consist of only the core-sheath spun yarn.

12. The turf reinforcement mat of claim 10, wherein the spun yarn is configured for ultraviolet (UV) resistance.

13. The turf reinforcement mat of claim 10, wherein the core-sheath spun yarn comprises the polypropylene fiber sheath.

14. The turf reinforcement mat of claim 10, wherein:
    the weft yarns comprise the core-sheath spun yarn;
    the warp yarns comprise the polypropylene or polyethylene terephthalate monofilament yarn having the round cross section;
    the polypropylene monofilament core has a denier of about 1800; and
    the polypropylene or polyester fiber sheath has a denier of about 1500.

15. The turf reinforcement mat of claim 10, wherein:
    the core-sheath spun yarn has a total of 100 denier to 11,000 denier; and
    a sheath weight percentage compared to a total weight of the core-sheath spun yarn ranges from about 10% to about 99%; and
    the core-sheath spun yarn includes filaments having 1 denier per filament to 60 denier per filament, and the filaments are coupled together to form a single or multiple yarns for a core, which are encapsulated in a single fiber or a blend of multiple fibers around the core.

16. A turf reinforcement mat configured for placement on soil for erosion control, the turf reinforcement mat comprising weft yarns and warp yarns interwoven with the weft yarns, wherein:
    the turf reinforcement mat has a plurality of portions defined by the warp yarns and the weft yarns that are configured to cooperatively define the plurality of portions to have pyramidal, honeycomb, or cuspated shapes protruding upwardly or downwardly relative to a plane of the turf reinforcement mat;
    one of the warp yarns or the weft yarns, but not both, comprise core-sheath spun yarn;
    the other one of the weft yarns or the warp yarns comprise polypropylene or polyethylene terephthalate monofilament yarn having a round cross section; and
    the core-sheath spun yarn comprises a polypropylene monofilament core having a round cross section and a polypropylene or polyester fiber sheath having a round cross section.

* * * * *